UNITED STATES PATENT OFFICE.

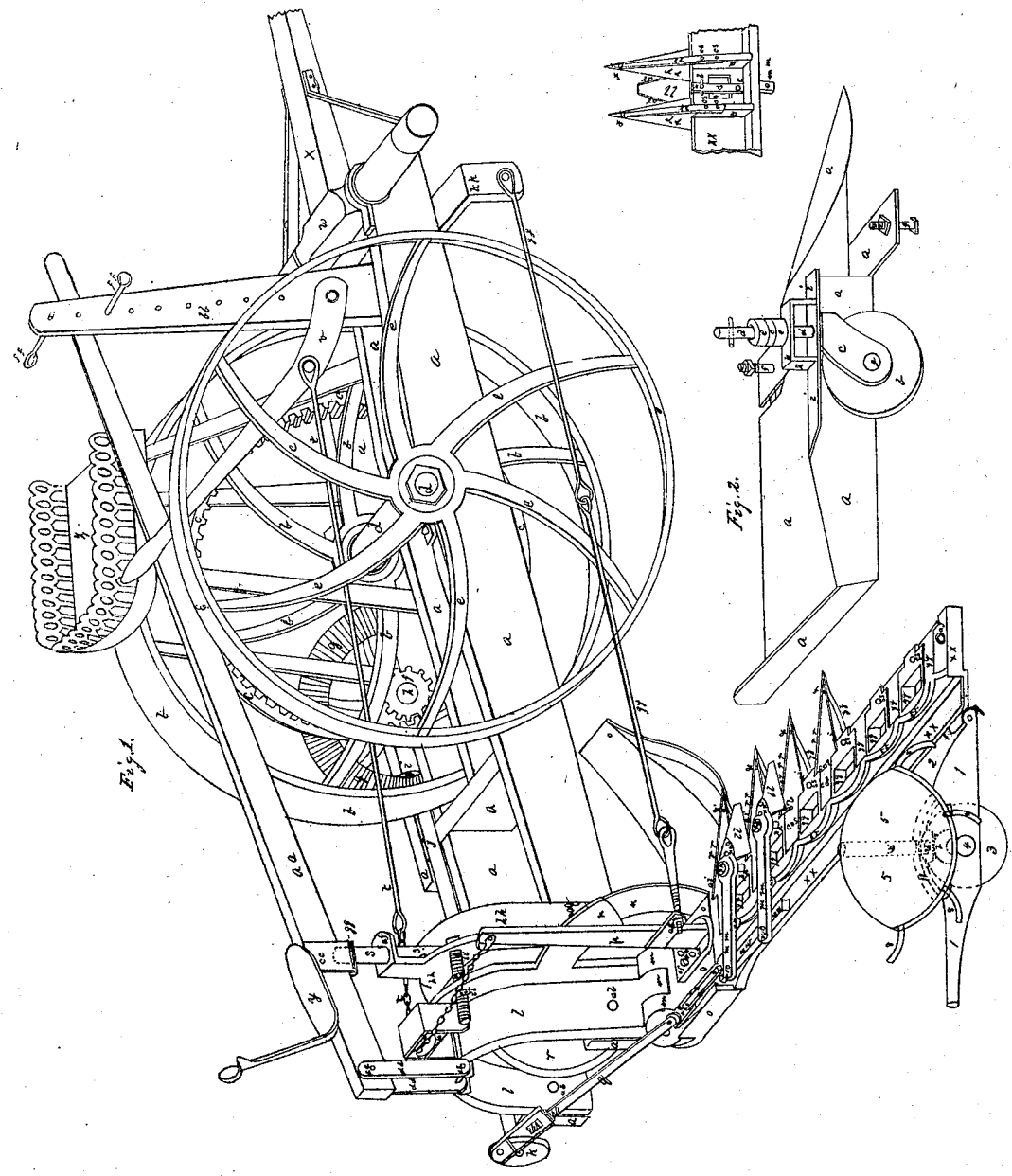

CYRENUS WHEELER, JR., OF POPLAR RIDGE, NEW YORK.

IMPROVEMENT IN GRAIN AND GRASS HARVESTERS.

Specification forming part of Letters Patent No. 12,367, dated February 6, 1855.

*To all whom it may concern:*

Be it known that I, CYRENUS WHEELER, Jr., of Poplar Ridge, in the town of Venice, county of Cayuga, State of New York, have invented and made certain new and useful Improvements in a Machine for Harvesting Grain and Grass; and I do hereby declare that the following is a full and accurate description of the construction and operation of the same, reference being had to the accompanying drawings, making part of this specification, in which—

Figure 1 is a perspective view of the machine; Fig. 2, a perspective view of the table for receiving the grain when cut, and Fig. 3 a view of the under side of a section of the cutter-bar with cutters and spring attached.

$a$, Fig. 1, is the frame-work of the machine; $b$, the driving-wheel; $c$, the rim attached to the driving-wheel $b$, having internal gear or cogs.

$d$ is a shaft to which the driving-wheel $b$ is attached; $e$, a wheel of same size as said driving-wheel and attached to shaft $d$ on the outside of the frame $a$, turning freely on the shaft as its axle and serving to support the frame in an upright position; $f$, pinion; $g$, face-wheel; $h$, shaft to which they are attached; $i$, pinion gearing into face-wheel $g$; $j$, shaft, to which pinion $i$ is attached; $k$, crank-wheel attached to shaft $j$; $l$, arched bar of iron or other substance attached to the hinder part of the framework of the machine by bolts $a$ $b$, on which it turns as on a pivot. $m$ is a rule-joint admitting of the rising and falling of the outer end of the cutter-bar $x$ $x$; $n$, segments of circles, one of which is firmly attached to the arch $l$, the other to the socket $o$, and serve to strengthen and support the joint $m$.

$o$ is a socket, to which the cutter-bar $x$ $x$ is fastened by bolts $a$ $c$.

$p$ is a standard firmly attached to the socket $o$ by the same bolts; $q$, the connecting-rod connecting the crank-wheel $k$ with the slide $a$ $d$.

$a$ $e$ is a short connecting-rod, uniting the slide $a$ $d$ with the driving-rod $w$ $w$, by which motion is imparted to the cutters $m$ $m$ and $l$ $l$.

$r$ is a caster-wheel; $s$, a spindle to the same, which spindle passes through the bail $h$ $h$ and its lip $a$ $f$; $t$, a rod and chain connecting the standard $p$ to the lever $v$.

$u$ is a pulley, fastened to the arch $l$, around which the chain $t$ passes.

$v$ is a lever, which serves through its connections to raise the outer end of the cutter-bar $x$ $x$ when desired by the operator; $w$, a roller, to which the tongue $x$ is attached; $y$, a seat for the person who rakes off the grain; $z$, a seat for the operator.

$a$ $a$ is a lever passing over the top of the spindle $s$ of the caster-wheel $r$, to which it is attached by a stirrup, $c$ $c$, the spindle $s$ passing through said stirrup and being kept in place by the pin $g$ $g$. The lever $a$ $a$ is connected at its back end to the arch $l$ by straps $d$ $d$ and bolts $e$ $e$. The lever $a$ $a$ extends forward of the operator's seat, and is secured at any required height by pins $f$ $f$ passing through the standard $b$ $b$.

$b$ $b$ is a standard attached to the frame-work $a$, and rising sufficiently to fasten the levers $a$ $a$ and $v$ at any required height by the pins $f$ $f$. The lever $a$ $a$ is used by the operator for pressing down on the spindle $s$ of the caster-wheel $r$, thereby raising the hinder part of the machine from the ground, and with it the heel or inner end of the cutter-bar $x$ $x$, for the purpose of passing obstructions when cutting, or of cutting grain higher from the ground when used as a harvester, or for the purpose of passing from one field to another. The lever $v$ serves by its connections $t$ $u$ and $p$ to raise the outer end of the cutter-bar $x$ $x$ either for passing obstructions or moving from one field to another.

$h$ $h$ is a strong iron bail, with a lip, $a$ $f$, attached to its upper part, it being of sufficient height to admit the caster-wheel $r$ to play freely under it. The space between the lower ends of the bail $h$ $h$ should be equal to the width of the frame $a$, to which it is bolted a few inches forward of the arched bar $l$ by bolts $a$ $g$. This bail serves for a stand to keep the caster-wheel $r$ in proper position, and as an attachment for securing the graduating-screw $i$ $i$, which passes through a part of the arch $l$, which arch is fixed and kept in any required position by the nuts $o$ $o$, thereby raising or depressing the points of the cutters $r$ $r$ and $l$ $l$, as desired, for operation.

$j$ $j$ is a rod attached to the standard $p$, near its base, by a screw and nut, $a$ $h$, and at the other end it is attached to a strong knee, $k$ $k$, which is fastened to the under side of the frame-work $a$, and projects outward beyond the wheel $e$, to prevent the rod $j$ $j$ from interfering with the motion of said wheel, and downward a few inches below the frame *a*. This rod serves to strengthen the joint *m*.

*x x* is the cutter-bar of the machine, composed of iron or other hard substance, in width from five to six inches, and in its thickest part from one and a half to two inches, and in length corresponding to the width of the swath desired to be cut.

*g g* are holes through the cutter-bar, back of the bolt-holes *s s* and in front of the ribs *t t*, and serve for the passage through the cutter-bar *x x* of the dirt and grit that would otherwise collect on the stationary cutters *r r*.

*t t* are circular ribs raised on the cutter-bar *x x* from one-eighth to one-fourth inch higher than the bar itself in front of them, and serve as a bearing for the projection *u u* on the under side of the shanks *m m*.

*y y* are cavities for inserting the stationary cutters *r r*.

*s s* are holes for inserting bolts *p p* for attaching the movable cutters *m m* and *l l*.

*r r* are the stationary cutters, composed of steel or other metallic substance from one-eighth to one-fourth inch thick, from eight to ten inches in extreme length, and from two to three inches wide in the widest part. The cutters *r r* are made narrower at the back end, forming a shank corresponding in width with the cavities *y y*, in which they are secured by rivets *c s*. The cutters *r r* should be tapered from their widest part to a point at their forward end to allow them to enter the standing grass or grain freely, and should be made sufficiently concave on their upper surface from their shank forward, so that when ground straight on their upper edges they will present narrow ribs or cutting-edges *a i* for the movable cutters *l l* to operate against.

*l l* are the upper or movable cutters. *m m* are shanks to the same. The cutters *l l* should be composed of steel from one-eighth to one-fourth inch thick, from three to five inches long, and from two to three inches wide at their widest point, tapering toward the forward end, which may be from one-half to one inch wide and made concave on the under side, *l l*, Fig. 3, and when ground should present a narrow rib or cutting-edge, *a i*, Fig. 3, on each side. *m m* are the shanks of the movable cutters *l l*, being in extreme length from six to eight inches, composed of iron or other metallic substance, being from three-fourths to one inch wide at the back part, and from one inch to one and a-half inch wide where the bolts *p p* pass through them. These shanks *m m* extend forward of the bolts *p p* far enough to fasten them on the top and back part of the cutters *l l* by rivets *n n*. On the under side of the shanks *m m* are projections *u u*, which extend from one-fourth to three-fourths inch below their under side and rest on the curved rib *t t*, and serving to keep the shanks *m m* free from the cutter-bar *x x*, and leaving an open space between the shanks *m m* and the cutter-bar *x x* of from one-fourth to three-fourths inch. The back end of the shanks *m m* has a hole through it, *v v*, for attaching them by pins to the driving-rod *w w*.

*p p* are bolts passing through the shanks *m m* of the cutters *l l*, and through the cutter-bar *x x* and a spring, *a*, Fig. 3, and is kept down by a pin, *b*, Fig. 3, which pin passes through the bolt *p p*, Figs. 1 and 3, at its lower end and across the spring *a*, Fig. 3. The bolt *p p* may be made of metal from one-half to three-fourths inch in diameter, and so fitted that it will slide freely through the cutter-bar *x x*, Fig. 1.

*a*, Fig. 3, is a flat spring about one inch wide, and from one-sixteenth to three-sixteenths inch thick, and from three to five inches long. The back end is fastened to the cutter-bar *x x* on the under side, back of the bolt *p p* about three inches, its forward end reaching beyond the bolt *p p*, which passes through it and is turned up in front of the cutter-bar *x x* sufficiently to prevent it (the spring *a*, Fig. 3) from catching the stubble. The spring *a*, Fig. 3, being of well-tempered steel, and being attached to the bolts *p p* by the pin *b* passing over it, serves to draw down the bolt through the cutter-bar *x x*, and through the shanks *m m* of the movable cutters *l l*. The head of the bolts *p p*, Fig. 1, resting on the shanks *m m*, serves to press the edges of the cutters *l l* firmly against the edges of the cutters *r r* with a uniform elastic pressure, the cutter-edges adjusting themselves in their movement by means of the bolt *p p* and spring *a*, Fig. 3, with a uniform pressure at all points of contact, the cutters severing all kinds of grass and herbage in the most perfect manner without clogging or buffing, and with much less friction, and consequently requiring much less power for effective operation than in machines heretofore in use. The shanks *m m* of the movable cutters *l l*, by having a free open space under them, and having only a bearing at *u u* and at the point where the bolts *p p* pass through them, move freely on such bolts as their pivots, the open space under the shanks *m m* preventing effectually all accumulation of gum and grit under the shanks *m m* of the cutters *l l* and around the bolts *p p*, and thus avoiding the difficulty experienced in other machines from "gumming."

*d*, Fig. 3, are ribs on the under side of the cutter-bar *x x*, corresponding in length to the width of the cutter-bar *x x*, from one to one and a half inch deep and from one-half to three-fourths inch thick. They serve to protect the spring *a*, Fig. 3, and lower end of the bolt *p p*, Fig. 3, from stones and other obstructions, and to lessen the friction of the cutter-bar *x x* on the ground when in use.

*z z* are braces or guards from one-half to three-fourths inch in breadth and thickness, united to the rib *d*, Fig. 3, on its under side by rivets *c s*, which rivets serve to connect it and the stationary cutters *r r* to the cutting-bar *x x*. They are curved upward, and are united at their points to the points of the stationary cutters $r\ r$ by rivets &, and serve to protect the cutters from injury when the machine is in operation.

$w\ w$, Fig. 1, is the driving-rod of the cutters $l\ l$, and by its connection with the crank-wheel $k$ and cutter-shanks $m\ m$ imparts motion to the said cutters $l\ l$.

1 2 3 4 5 6 7 8 9 10 11, Fig. 1, when combined, form a revolving rake, of which 1 represents a light frame, from two and a half to three feet long, of sufficient width and height to hang a wheel, 3, from seven to ten inches in diameter, on a shaft, 4, which passes through it and on each side through the frame 1, the wheel 3 revolving with its shaft. The shaft 4 extends through the frame 1, and on its inner or left-hand end has a bevel or miter wheel, 7, attached, which wheel may be from three to four inches diameter, having cogs or teeth. 5 is a wheel from ten to twelve inches in diameter, having its upper surface oval or convex and its under surface concave. It is firmly attached to a shaft, 6, which passes through a cap, 11, in which the shaft 6 revolves. At the lower end of the shaft 6 is attached a bevel or miter wheel, 10, which gears into wheel 7. In the outer edge of wheel 5 I insert from four to ten teeth, 8, from four to six inches long, and curved backward and downward sufficiently to shed the grass freely when in motion. 2 is an apron from ten to fourteen inches long and from six to eight inches wide, fastened to the frame-work 1 on the top and in front of the wheel 3, with its forward edge nearly touching the cutter-bar $x\ x$ and its back edge reaching under the front edge of wheel 5, the teeth 8 in the revolution of the wheel 5 passing over the apron 2. The frame 1 is attached to the outer end of the cutter-bar $x\ x$ on its back edge by a hinge, 9. In the movement of the cutter-bar $x\ x$ forward the frame 1 follows, the under part of the wheel 3 resting on the ground and revolving with its axle 4 and cog-wheel 7, which wheel imparts motion to the cog-wheel 10 and its shaft 6, carrying round the convex wheel 5 in a horizontal manner, the teeth 8 passing from right to left along the apron 2, and effectually removing the cut from the standing grass, and leaving a clear and uniform track adjoining the standing grass from ten to twelve inches wide, and depositing the grass cut and removed free from bunches.

Fig. 2 is a detached view of the table for receiving the grain cut by the machine when used as a harvester. It is attached to the cutter-bar $x\ x$, Fig. 1, by bolts $f$, Fig. 2, passing through the holes $a\ j$, Fig. 1. $a$, Fig. 2, is the frame-work and platform of the table, which may be of any light material possessing sufficient strength, and should correspond in length to the length of the cutter-bar $x\ x$, to which it is bolted, and be of sufficient width to hold the tallest grain. $b$, Fig. 2, is a wheel from eight to twelve inches in diameter and from two to three inches thick; $g$, a shaft, to which the wheel $b$ is attached; $c$, a strap or leg of spindle $d$, the whole combined making a caster-wheel, which is attached to the outer end of the table $a$, Fig. 2, a few inches back of the place where the table $a$, Fig. 2, attaches to the cutter-bar $x\ x$, Fig. 1, and is kept in position by the spindle $d$ passing through a projection, $i$, of the table $a$ and a cap, $h$, and which is fastened on top of such projection, admitting of its turning freely in such projection $i$ and cap $h$. $e$ are washers on the spindle $d$, and serve, when placed on such spindle below the projection $i$, to raise the table $a$ to any required height and keep it and the cutter-bar $x\ x$ at such height when used as a harvester of grain.

Having thus fully set forth my improvements in the foregoing description, I will proceed to state my claims.

In the first place, I do not claim the frame-work $a$, Fig. 1, the driving-wheel $b$, its cogged rim $c$, shaft $d$, pinion $f$, face-wheel $g$, shaft $h$, pinion $i$, shaft $j$, crank-wheel $k$, driver's seat $z$, raker's seat $y$, connecting-rod $q$. Neither do I in this intend to disclaim the screw $i\ i$, nuts $o\ o$, arched bar $l$ and its pivotal attachment $a\ b$, the joint $m$, quadrants $n$, socket $o$, standard $p$, caster-wheel $r$, spindle $s$, rod and chain $t$, pulley $u$, lever $v$, bail $h\ h$, having previously invented them or their equivalents, which are fully set forth and described in a caveat and drawings filed by me in the Patent Office on or about the 28th of November, 1853, and still further described in a specification, model, and drawings filed in the same office on or about the 16th of March, 1854; but What I do claim, and desire to secure by Letters Patent, is—

1. The combination of the double-edged cutters $r\ r$, Fig. 1, with the cutter-bar $x\ x$, the braces $z\ z$, the vibrating cutters $l\ l$, their shanks $m\ m$, projections $u\ u$, the circular ribs $t\ t$, the bolts $p\ p$, the spring $a$, Fig. 3, the holes $g\ g$, Fig. 1, the ribs $d$, Fig. 3, and the cavities $y\ y$, Fig. 1, or their equivalents, substantially as set forth, the whole forming the cutting apparatus of the machine.

2. The revolving or track rake consisting of its frame 1, Fig. 1, it wheel 3, shaft 4, pinions 7 and 10, shaft 6, wheel 5, teeth 8, apron 2, joint 9, and cap 11, or their equivalents, arranged and combined substantially as set forth.

CYRENUS WHEELER, Jr.

Witnesses:
S. J. BOWEN,
AMAZIAH UNDERHILL.